United States Patent
Pratt et al.

(10) Patent No.: US 6,866,227 B2
(45) Date of Patent: Mar. 15, 2005

(54) PRESSURE RESPONSIVE BLOWOUT LATCH WITH RESERVOIR

(75) Inventors: John D. Pratt, Laguna Niguel, CA (US); Timothy S. Rozema, Ladera Ranch, CA (US)

(73) Assignee: Hartwell Corporation, Placentia, CA (US)

(*) Notice: Subject to any disclaimer, the term of this patent is extended or adjusted under 35 U.S.C. 154(b) by 178 days.

(21) Appl. No.: 10/462,144

(22) Filed: Jun. 16, 2003

(65) Prior Publication Data

US 2004/0094670 A1 May 20, 2004

Related U.S. Application Data

(63) Continuation-in-part of application No. 10/138,283, filed on May 3, 2002.
(60) Provisional application No. 60/389,081, filed on Jun. 14, 2002, and provisional application No. 60/326,942, filed on Oct. 4, 2001.

(51) Int. Cl.[7] ............................................. E05B 65/10
(52) U.S. Cl. ........................ 244/129.4; 244/129.5; 292/21; 292/92; 292/93; 292/254; 49/503
(58) Field of Search ........................ 244/129.4, 129.5, 244/129.1; 292/21, 92, 93, 254; 49/503

(56) References Cited

U.S. PATENT DOCUMENTS

| | | | |
|---|---|---|---|
| 1,950,387 A | 3/1934 | Fischer ........................ 189/45 |
| 2,156,387 A | 5/1939 | Goldfinger ................... 292/144 |
| 2,606,052 A | 8/1952 | Soreng et al. ............... 292/144 |
| 2,774,116 A | 12/1956 | Wolverton | |
| 3,638,984 A | 2/1972 | Davidson ............... 292/341.16 |
| 3,704,845 A | 12/1972 | Ord ............................. 244/121 |
| 3,738,681 A | 6/1973 | Wada et al. .......... 280/150 AB |
| 3,753,316 A | 8/1973 | Savarieau et al. ............. 49/31 |
| 3,861,727 A | 1/1975 | Froerup et al. ........ 292/341.16 |
| 3,938,764 A | 2/1976 | McIntyre et al. ........ 244/117 R |
| 3,981,302 A | 9/1976 | Veit ........................... 128/203 |
| 4,042,193 A | 8/1977 | Cerne ....................... 244/129.1 |
| 4,048,756 A | 9/1977 | Lawrence .................... 49/171 |
| 4,126,341 A | 11/1978 | Bradstock .................. 292/201 |
| 4,383,666 A | 5/1983 | Allerding et al. ......... 244/118.5 |
| 4,390,152 A | 6/1983 | Jorgensen ................ 244/118.5 |
| 4,432,514 A | 2/1984 | Brandon ................... 244/118.5 |
| 4,522,359 A | 6/1985 | Church et al. ........... 244/129.5 |
| 4,552,326 A | 11/1985 | Bokalot .................... 244/129.5 |
| 4,681,286 A | 7/1987 | Church et al. ........... 244/129.5 |
| RE32,554 E | 12/1987 | Murphy .................... 244/118.5 |
| 4,720,065 A | 1/1988 | Hamatani ................. 244/129.5 |
| 4,756,566 A | 7/1988 | Logas ....................... 292/341.16 |
| 4,915,326 A | 4/1990 | Plude ........................ 244/129.5 |

(List continued on next page.)

*Primary Examiner*—J. Woodrow Eldred
(74) *Attorney, Agent, or Firm*—Barnes & Thornburg LLP

(57) ABSTRACT

A method and apparatus for maintaining a panel in a closed position and releasing a panel upon application of changes resulting from a pressure change in an area adjoining the panel. The apparatus includes a latch mechanism attached to a structure having a bolt for engaging corresponding panel. The latch mechanism may be retained on the corresponding panel with the bolt engaging the structure. A pressure responsive device is provided to detect a change in pressure on one side of the panel and facilitating release of the bolt in response to a pressure change of a predetermined range or force. The latch mechanism and pressure responsive device vent to or communicate with only one side of the panel. A reservoir on one side of the panel communicates with a pressure responsive chamber of the pressure responsive device. The reservoir is generally on the same side of the panel to provide a pressure volume which is generally isolated from ambient pressure, such as during a decompression event. The method includes a method of maintaining a latch mechanism in a closed position subject to a pressure change, including sensing the pressure change on only one side of the panel.

20 Claims, 16 Drawing Sheets

U.S. PATENT DOCUMENTS

| | | | | |
|---|---|---|---|---|
| 4,917,425 A | 4/1990 | Logas | ................... | 292/341.16 |
| 4,986,584 A | 1/1991 | Logas | ................... | 292/314.16 |
| 5,046,686 A | 9/1991 | Carla et al. | ............... | 244/118.5 |
| 5,118,053 A | 6/1992 | Singh et al. | ............. | 244/118.5 |
| 5,118,150 A | 6/1992 | Jarrett | ................... | 292/314.16 |
| 5,163,639 A | 11/1992 | Herrmann et al. | ....... | 244/129.5 |
| 5,251,851 A | 10/1993 | Herrmann et al. | ....... | 244/129.5 |
| 5,289,615 A | 3/1994 | Banks et al. | .................. | 16/366 |
| 5,305,969 A | 4/1994 | Odell et al. | ............... | 244/129.5 |
| 5,337,977 A | 8/1994 | Fleming et al. | .......... | 244/129.5 |
| 5,379,971 A | 1/1995 | Kim et al. | ............... | 244/129.5 |
| 5,480,109 A | 1/1996 | Klein et al. | .............. | 244/129.5 |
| 5,490,699 A | 2/1996 | Uyeda | ................... | 292/341.16 |
| 5,535,804 A | 7/1996 | Guest | ......................... | 160/180 |
| 5,577,781 A | 11/1996 | Kallies et al. | .............. | 292/195 |
| 5,667,169 A | 9/1997 | Erben et al. | ............. | 244/129.5 |
| 5,765,883 A | 6/1998 | Dessenberger et al. | ....... | 292/97 |
| 5,782,511 A | 7/1998 | Schwartz | .................... | 292/219 |
| 5,823,473 A | 10/1998 | Odell et al. | .............. | 244/129.5 |
| 5,879,034 A | 3/1999 | Johns | ........................ | 292/195 |
| 6,116,542 A | 9/2000 | Erben | ...................... | 244/129.5 |
| 6,168,114 B1 | 1/2001 | Erben | ...................... | 244/129.5 |
| 6,484,449 B1 | 11/2002 | Artsiely | ....................... | 49/506 |
| 6,669,144 B2 | 12/2003 | Artsiely | .................. | 244/129.5 |
| 2003/0052227 A1 * | 3/2003 | Pittman | .................. | 244/118.5 |

* cited by examiner

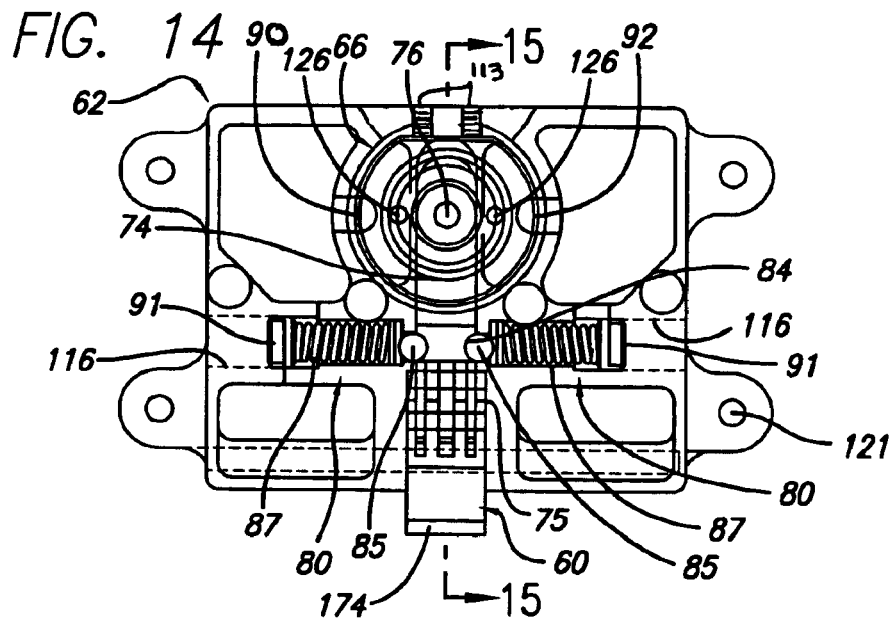
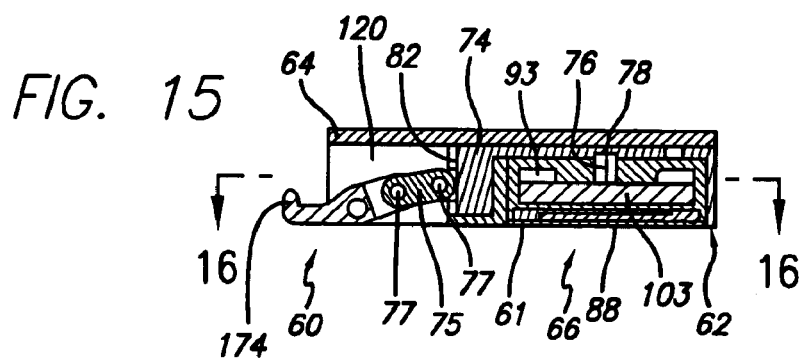
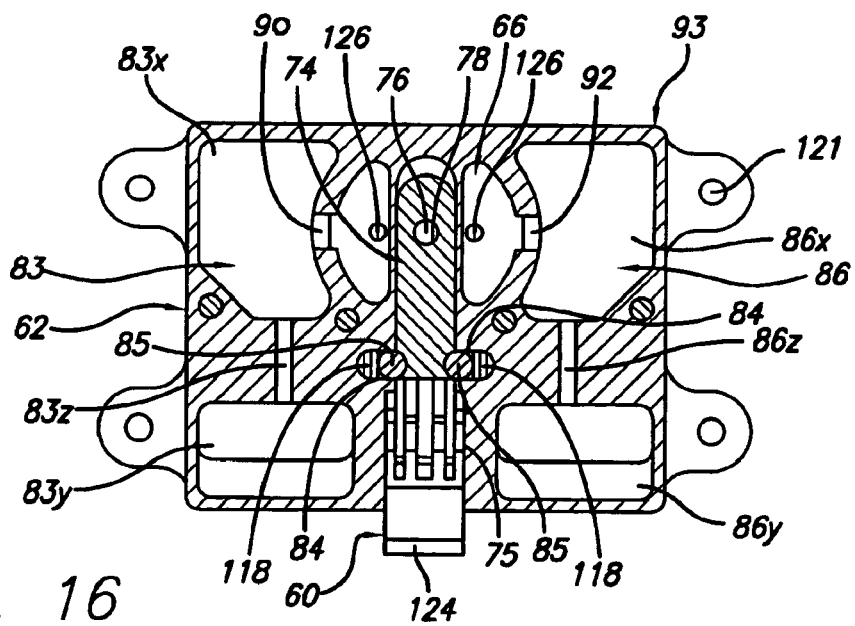

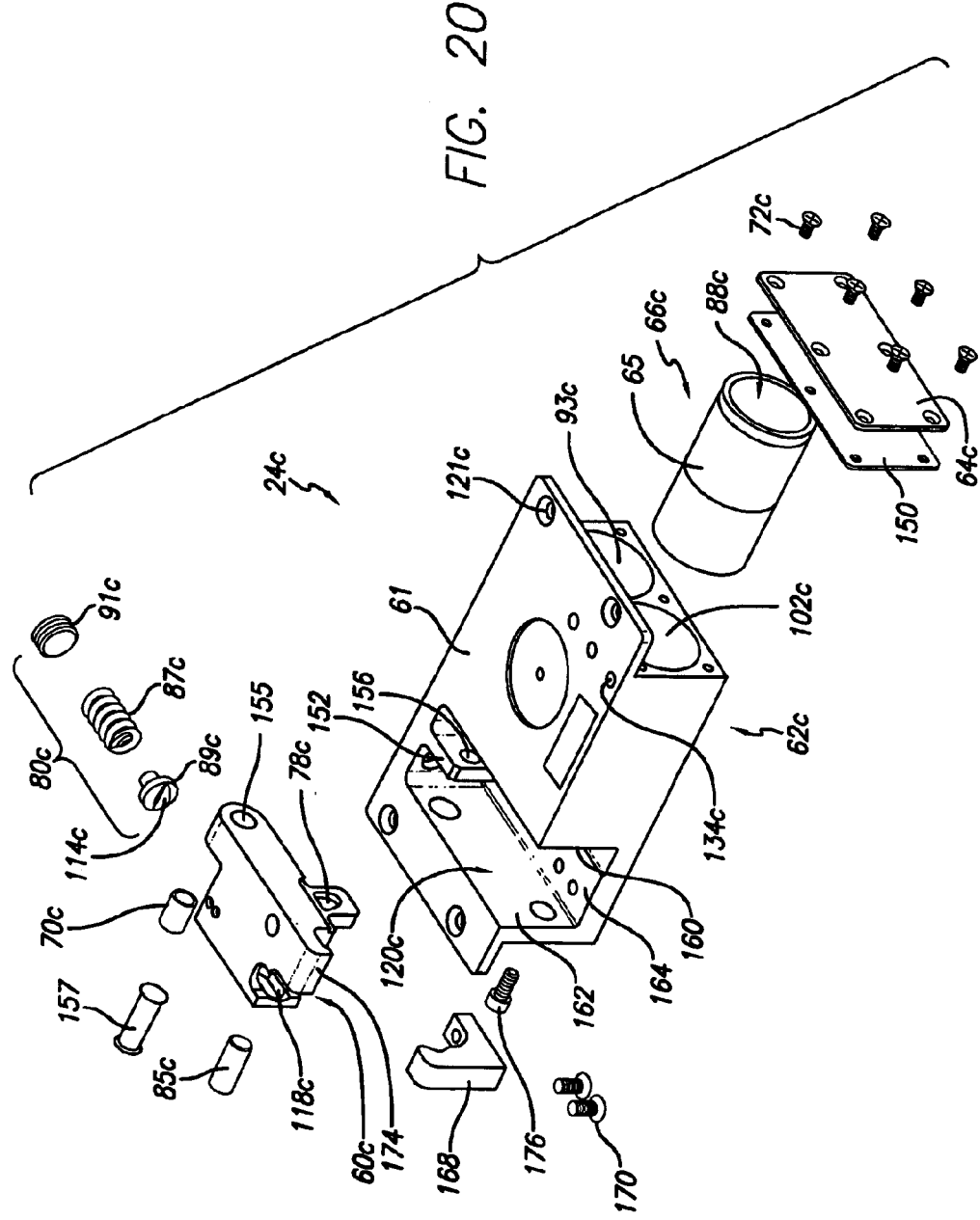

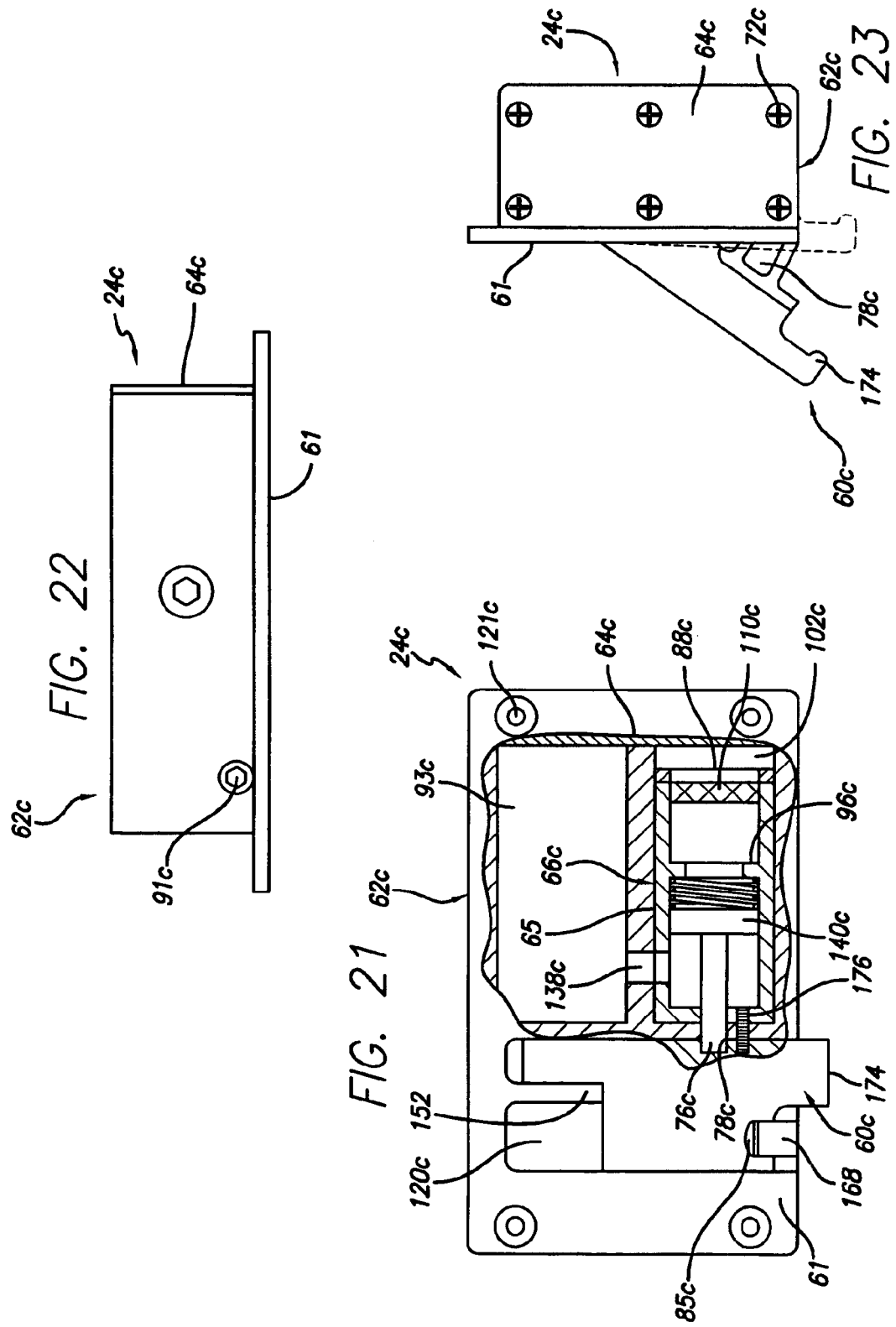

PRESSURE RESPONSIVE BLOWOUT LATCH WITH RESERVOIR

CROSS-REFERENCE

This application claims priority from U.S. Provisional Application Ser. No. 60/389,081, filed Jun. 14, 2002 and is a continuation-in-part of U.S. Ser. No. 10/138,283, filed May 3, 2002, which claims priority from U.S. Provisional Application Ser. No. 60/326,942, filed Oct. 4, 2001.

BACKGROUND

The present disclosure relates generally to the field of latch mechanisms and particularly to a latch mechanism utilized in an aircraft. More particularly, the present disclosure relates to a latch mechanism which operates in response to a pressure change on at least one side of a barrier in an aircraft to allow a panel associated with the barrier to release upon a given set or range of pressure conditions.

By way of review, a variety of latch mechanisms have been developed to maintain panels, doors and other structures in a closed position. The reference to panels, doors and other structures relates to the use of latch mechanisms to retain a first body, such as a panel relative to a second body, such as a frame. With regard to the example of panels, a panel includes one portion which might be rotatably hinged or otherwise movably retained on a corresponding structure such as a frame. The panel serves to close or cover at least a portion of an opening defined by the frame for a variety of purposes including providing a barrier to prevent passage through the opening.

A variety of latch mechanisms have been developed to facilitate the movement or "blowout" of a panel relative to the frame. Such blowout latch mechanisms have been developed by Hartwell Corporation, assignee of the present disclosure, to facilitate disengagement of a panel from a frame or other structure under a set or range of "blowout" conditions. For example, if a pressure differential develops on opposite sides of a barrier or within an area at least partially housed or contained by the panel, the pressure differential will rise to a point where the panel may be forcibly removed, disengaged or "blown out" from the frame by forces associated with the pressure differential. Under these conditions, it is desirable to set the blowout force at a desired level or range so that premature disengagement of the panel from the primary structure does not occur. In this situation, the blow out load level can be set so that a predetermined pressure differential disengages the panel from the primary structure to protect and preserve the integrity of the frame and any related structures and devices.

In some situations, it would be desirable to maintain a panel in a closed position under one level or range of pressure conditions yet release the panel under a second range or set of conditions. Such level or range may or may not overlap or may be discrete ranges or, in fact, points. The panel in such a situation generally is in an environment where the pressure on either side of the panel is generally equalized. The panel may include a sealing structure to prevent the unwanted or abrupt passage of air there through. However, the pressure on either side of the panel is generally equal.

One example of the use of such a panel in a well-known environment is the use of a panel in a pressurized cabin such as in an aircraft. The panel is employed as a barrier to separate the flight crew, passengers and/or cargo into discrete areas. Such a panel may be used between the flight deck and passenger compartment as well as perhaps between the passenger compartment and corresponding storage area which is not occupied by passengers. In the situation in which the panel is used on an aircraft in which the cabin is pressurized, it may be desirable to maintain the panel in a closed position for many situations but allow the panel to be opened when the pressure differential between the two compartments changes. Such a pressure differential may occur in the case where cabin pressure drops in the cargo compartment due to a leak or other loss of pressure. Under these circumstances, it might be desirable to allow the cabin pressure to generally equalize to avoid or minimize damage which might result from the pressure differential.

Similarly, in a situation where a panel is positioned between the flight deck and the passengers, it may be desirable to release the panel and equalize the pressure between the flight deck and passenger area. In the situation in which the panel is positioned between the flight deck and passenger area, it might be desirable to allow the panel to disengage, rather than having the door structurally fail as a result of the unequal pressure differentials.

For example, the panel to the flight deck generally is maintained in a closed and latched position while in flight to maintain privacy and security of the flight crew. This prevents the passage of passengers or terrorists into the flight deck area. Increased latching strength is required in order to prevent a passenger or terrorist from forcibly opening the panel. However, in a situation in which pressure is lost in the passenger compartment, it may be desirable to allow the panel to release in order to prevent the panel from being forcibly removed from the structure by the pressure differential. This would help prevent injury to passengers if the panel were forcibly removed from the frame and expelled into the passenger compartment. By allowing the panel to release in response to the pressure differential between the flight deck and passenger compartment, the panel will open thereby providing increased safety. Similarly, if the pressure differential occurs as a result of loss of pressure in the flight deck, the panel will be allowed to disengage the frame, yet be retained thereon, to provide pressure equalization to prevent injury to the flight crew and equipment.

With the foregoing in mind, it would be desirable to provide a method, system and apparatus to provide unlatching of the door latch under a range or set of pressure differential circumstances.

Additional features of the disclosure will become apparent to those skilled in the art upon consideration of the following detailed description of the disclosed embodiments.

BRIEF DESCRIPTION OF THE DRAWINGS

The detailed description particularly refers to the accompanying figures in which:

FIG. 14 is a plan view of the latch mechanism with the cover removed to show the structure therein;

FIG. 15 is a partial fragmentary cross-sectional view taken along line 15—15 of FIG. 14;

FIG. 16 is a cross-sectional view taken along line 16—16 in FIG. 15;

FIG. 20 is an exploded perspective view of another embodiment of the latch mechanism;

FIG. 21 is a partial fragmentary, cross-sectional, plan view of the latch mechanism shown in FIGS. 20–23;

FIG. 22 is a side view of the assembled mechanism of FIG. 21; and

FIG. 23 is a side view of the assembled mechanism as shown in FIGS. 21 and 22.

DETAILED DESCRIPTION

Figure 1:
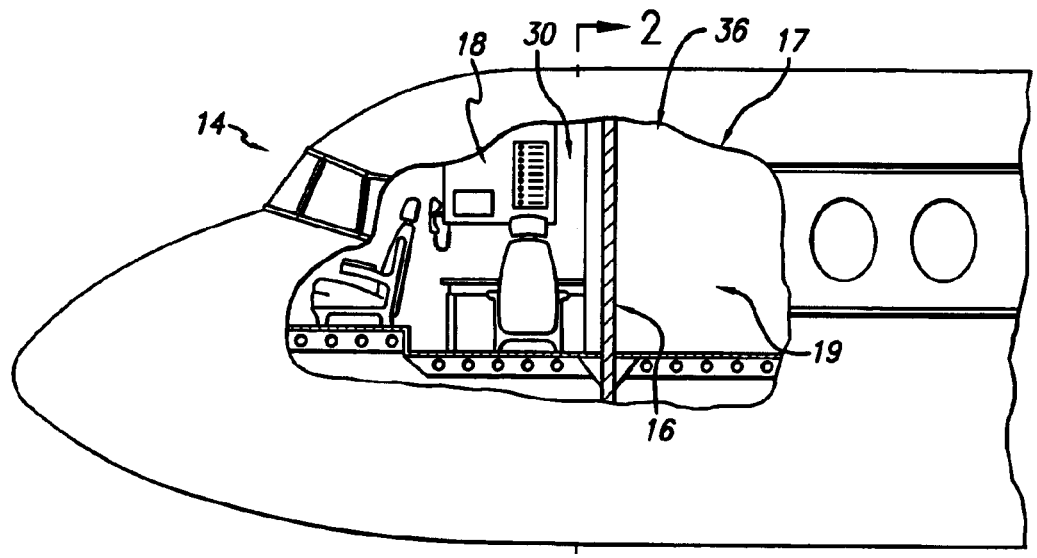
FIG. 1 is a partial fragmentary view of a portion of an aircraft having a barrier which is positioned between a cockpit area and a passenger area.

While the present disclosure may be susceptible to embodiment in different forms, there is shown in the drawings, and herein will be described in detail embodiments with the understanding that the present description is to be considered an exemplification of principles of the disclosure and is not intended to limit the disclosure details of construction and the arrangements of components set forth in the following description or illustrated in the drawings.

This application is a continuation-in-part of U.S. application Ser. No. 10/138,283, filed May 3, 2002 which is incorporated herein by reference in its entirety. The present disclosure was not made, conceived or first actually reduced to practice under nor is there any relationship of the disclosed apparatus to the performance of any work under the National Aeronautics and Space Administration.

FIG. 1 shows a fragment of a front section of an aircraft 14 in which a portion of the outside of the aircraft 14 has been broken away to illustrate a barrier 16. The barrier 16 divides an internal compartment 17 to separate a flight deck or cockpit area 18 from a passenger area 19. As it will be described in detail herein below, the present disclosure helps to prevent unpermitted or unauthorized access from the passenger compartment 19 to the cockpit 18. Also, the disclosure allows automatic opening of the barrier 16 in the event of depressurization or decompression in either the cockpit 18 or passenger compartment 19.

Figure 2:
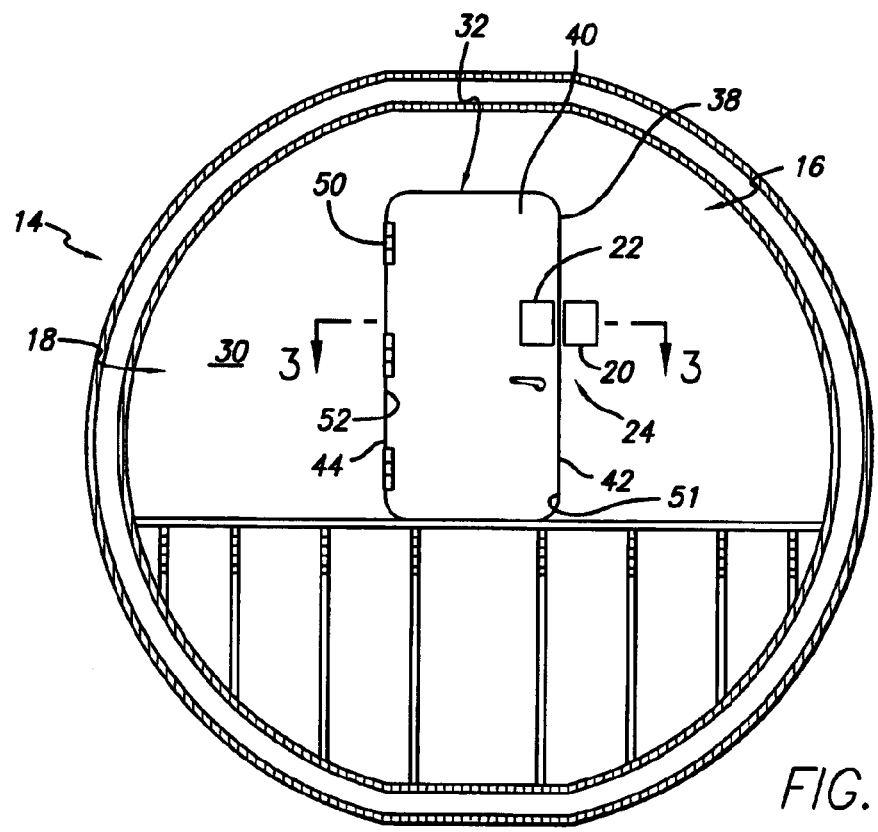
FIG. 2 is a diagrammatic cross-sectional view taken along line 2—2 of FIG. 1 showing a panel in the barrier employing a latch mechanism.

FIG. 2 provides a general diagrammatic illustration taken along line 2—2 in FIG. 1 showing a view from the cockpit area 18 facing the barrier 16. As shown generally in FIG. 2, latch mechanism 24 includes a first latching portion 20 and a second receiving portion 22. In the illustrative embodiment, first latching portion 20 is responsive to pressure differentials or pressure change in the cockpit 18 or the passenger area 19, as described further herein.

The door or panel assembly 32 includes a frame structure 38 and a panel 40. The panel 40 includes a free end 42 and a movably retained end 44. Depending on the design of the panel, the panel 40 may swing inwardly towards the cockpit 18 or outwardly toward the passenger area 19, or swing both directions. The movement of the panel 40 depends upon the retaining structure 50, such as a hinge structure, which attaches the retained end 44 to a receiver portion 51 of the frame structure 52. In summary, the free end 42 of the door panel 40 moves relative to the retained end 44 by way of the retaining means 50 to move the panel relative to the receiver portion 51 of the frame structure 52. It should be noted that the panel 40 may not include an entire door structure and may instead be a panel retained on and as part of the door structure such that the door structure may actually define a portion of a frame relative to the panel in this example.

The first and second portions 20, 22 are attached to respective, generally proximate areas on the frame 38 and panel 40. The first and second portions, 20, 22 make up the latch mechanism 24. It should be understood, however, that it is within the scope of the disclosure to exchange the functions of first portion 20 and second portion 22 such that first portion 20 is the retaining portion and second portion 22 is the latching portion. Additionally, it should be understood that the latch mechanism 24 may be contained in one of the portions 22, 20 such that the structure extends from the latch mechanism 24 and would engage the corresponding oppositely positioned structure. For example, in a situation in which the latch mechanism 24 is in the form of a latch assembly position such as first portion 20 in FIG. 2. In this situation, the latch mechanism (24) may include a bolt 60 or other extending portion which engages the panel 40. In this situation there may not be a separate component into which the bolt 60 is received. It is fully within the scope of the present disclosure that the latch mechanism 24 may be a single component with a portion to engage or otherwise retain the panel or door 40 to which a latch mechanism 24 is attached.

As will be described in greater detail herein, the latch mechanism 24 illustratively functions to provide a resistance force which resists separation of the panel 40 from the corresponding frame 38. In this regard, the panel 40 is retained or locked in position until other pressure related conditions are met. The retaining force is generally illustrated as a mechanical arrangement whereby one mechanism engages a corresponding area to prevent dislodgement of the panel 40 from the frame 38. It is also envisioned that portions 20, 22 making up the latch mechanism 24 may have a magnetic force such that the magnetic force resists displacement of the door panel 40 relative to the frame 38. As shown in the embodiment of FIGS. 3–12, first portion 20 of latch mechanism 24 includes a bolt 60 which engages a corresponding second receiving portion 22 coupled to the panel 40, thereby preventing disengagement of the panel 40 from the frame 38.

As illustrated, the latch mechanism 24, such as first portion 20, comprises a housing 62, a cover 64, and a pressure responsive device 66 shown herein with an air cylinder 65 and a reservoir 93 configured to lock or unlock bolt 60. The cover 64 is mounted against the barrier 16 and may be provided in the form of an armor material to resist damage to the latch mechanism from a gun shot or other destructive force. Illustratively, bolt 60 pivots about an axis 68 defined by rod 70 which is positioned in bore 119 and retained therein by set screw 121. However, it is within the scope of the disclosure to provide other means of moving bolt 60. For example, bolt 60 could be moved laterally relative to housing 62 between an extended position and a retracted position. This movement could also be controlled by a piston, for example, with a piston that is mounted transverse to the illustrative pressure responsive device 66. The pressure responsive device 66 detects a decrease in pressure on one side of the panel.

Figure 3:
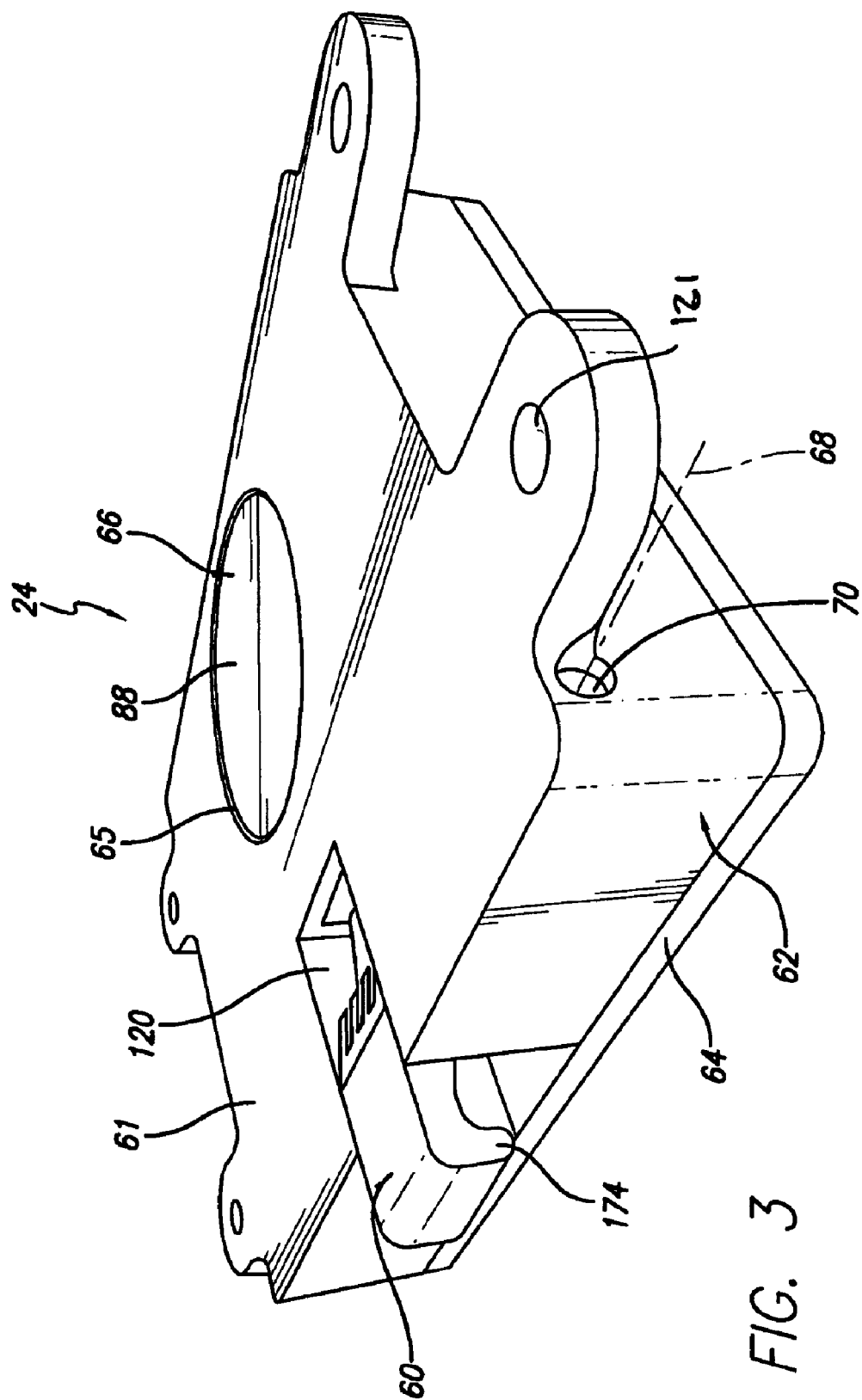
FIG. 3 is a diagrammatic perspective view of the latch mechanism showing a bolt movable between a locked or engaged position and an unlocked or disengaged position, and showing one end of a pressure responsive device.
Figure 4:
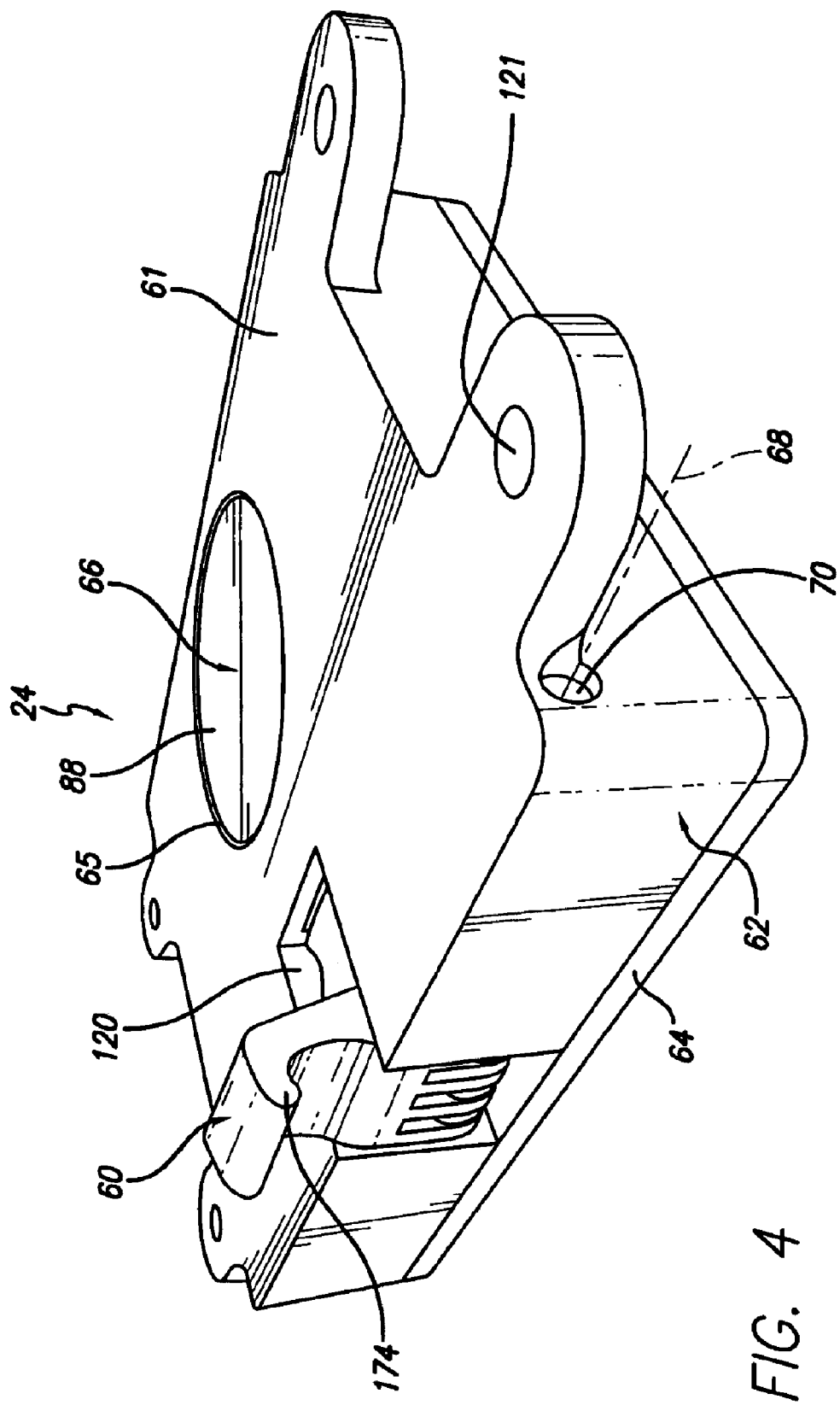
FIG. 4 is a diagrammatic perspective view of the latch mechanism shown in FIG. 3, showing the bolt in the unlocked or disengaged position.
Figure 5:
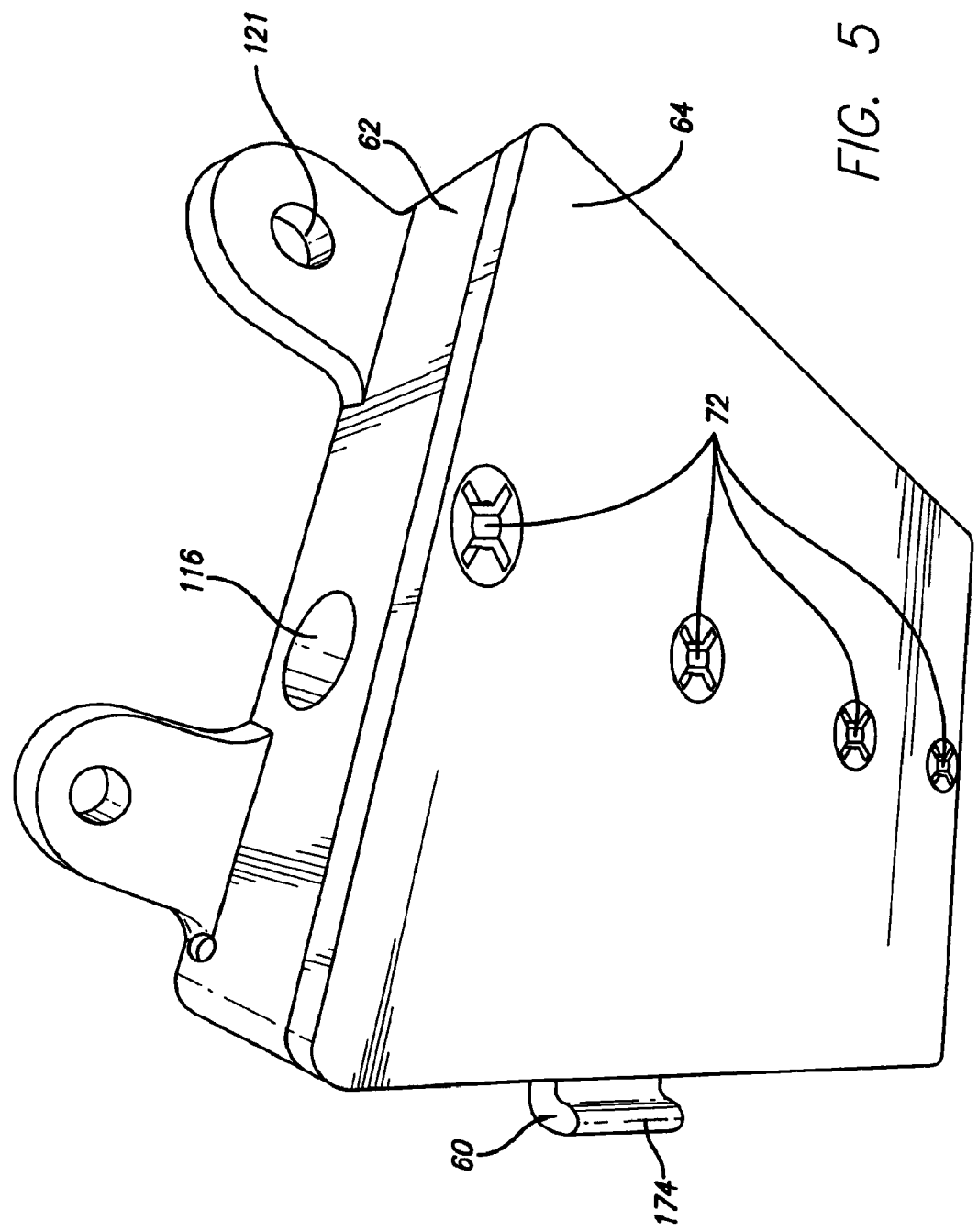
FIG. 5 is a bottom view of a cover of the latch mechanism.

As will be described further within, bolt 60 can be moved between a locked position as shown in FIG. 3 and an unlocked or released position, shown in FIG. 4. In the unlocked position, bolt 60 is rotated or disengaged such that panel 40 may be moved relative to frame structure 38. It should be noted that the receiving portion 22 may be in the form of a strike plate as well as a strike pocket or other bolt retaining device. The strike plate or bolt pocket may be attached to the panel to provide secure engagement of the bolt 60 therewith. FIG. 5 is a rear view of first portion 20, showing cover 64 fastened to housing 62 with fasteners 72.

Internal elements of first portion 20 can be seen in FIGS. 6–12, wherein cover 64 has been removed. Illustratively, bolt 60 is pivotably coupled to a first end of slider 74. The slider 74 with a link 75 retained therebetween with link pins 77, is configured to slidably move and articulate relative to pressure response device 66. As noted above, pressure responsive device 66 illustratively includes a pneumatic piston (see, FIG. 13), however, it is within the scope of the disclosure for pressure responsive device 66 to comprise any type of pressure-actuated switch, for example, an electrically powered solenoid. Air cylinder 65 of the pressure responsive device 66 illustratively moves a bolt engaging device 76 in the form of a shear pin 76 between a position in which it engages the slider 74 (see, FIG. 7) and a disengaged (See, FIG. 9) position in which it is disengaged from the slider 74. In the engaged position, shear pin 76 is operatively engaged with the slider 74 to resist movement of the slider 74. As illustrated, the pin 76 mates with or otherwise engages a receiving structure 78, shown in the form of an aperture 78 formed in slider 74 such that slider 74 cannot move relative to pressure responsive device 66. When slider 74 is locked in this position, bolt 60 is held in its locked position, thereby securing panel 40 relative to frame structure 38. Another view of actuator 66, bolt 60, shear pin 76, and slider 74 having aperture 78 can be seen in FIG. 10. In this perspective view of the internal elements of first portion 20 removed from housing 62, shear pin 76 can be seen mated with aperture 78.

Figure 6:
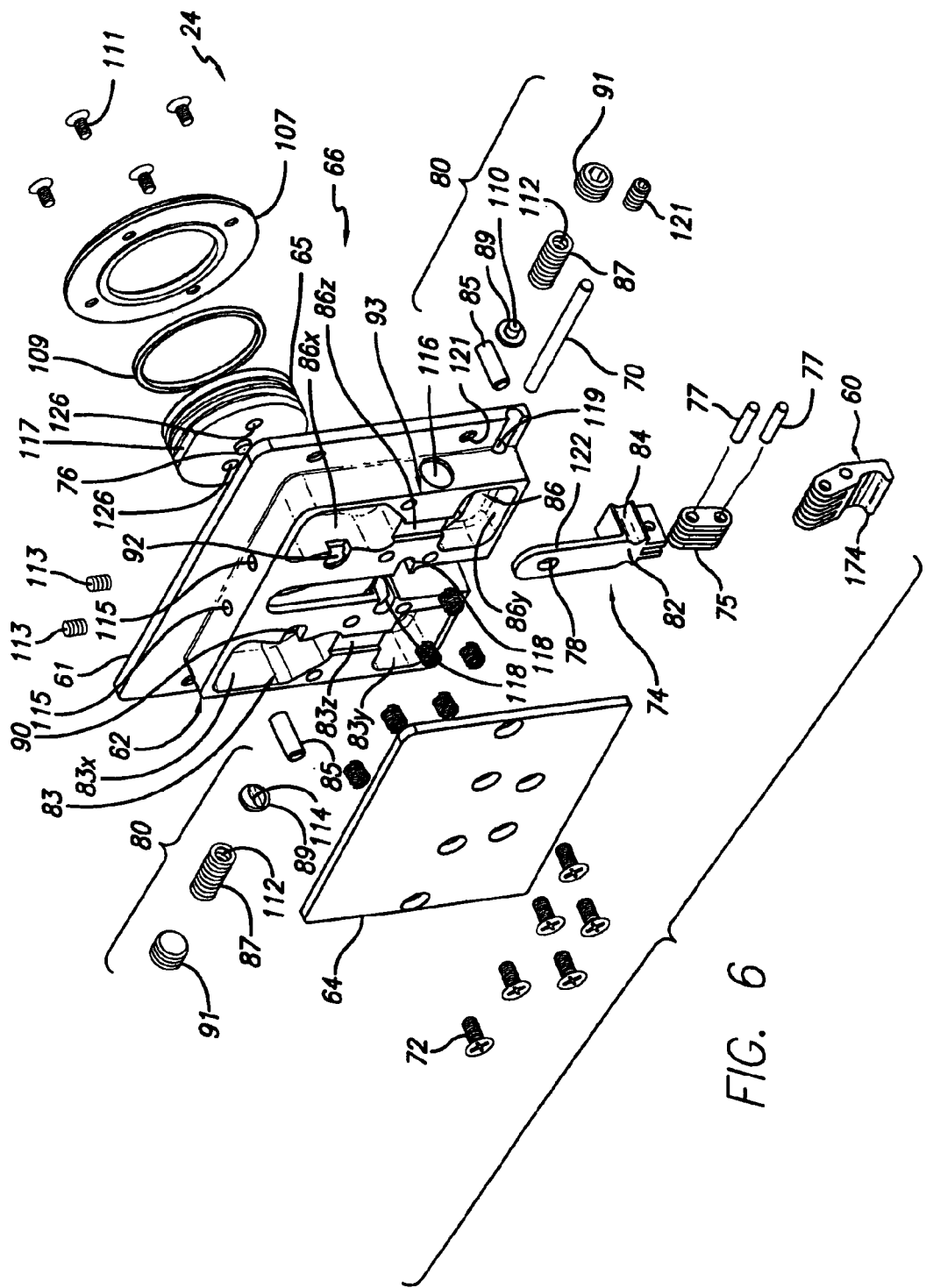
FIG. 6 is an exploded perspective view of the latch mechanism shown in FIGS. 1–5 and 7–16.
Figure 7:
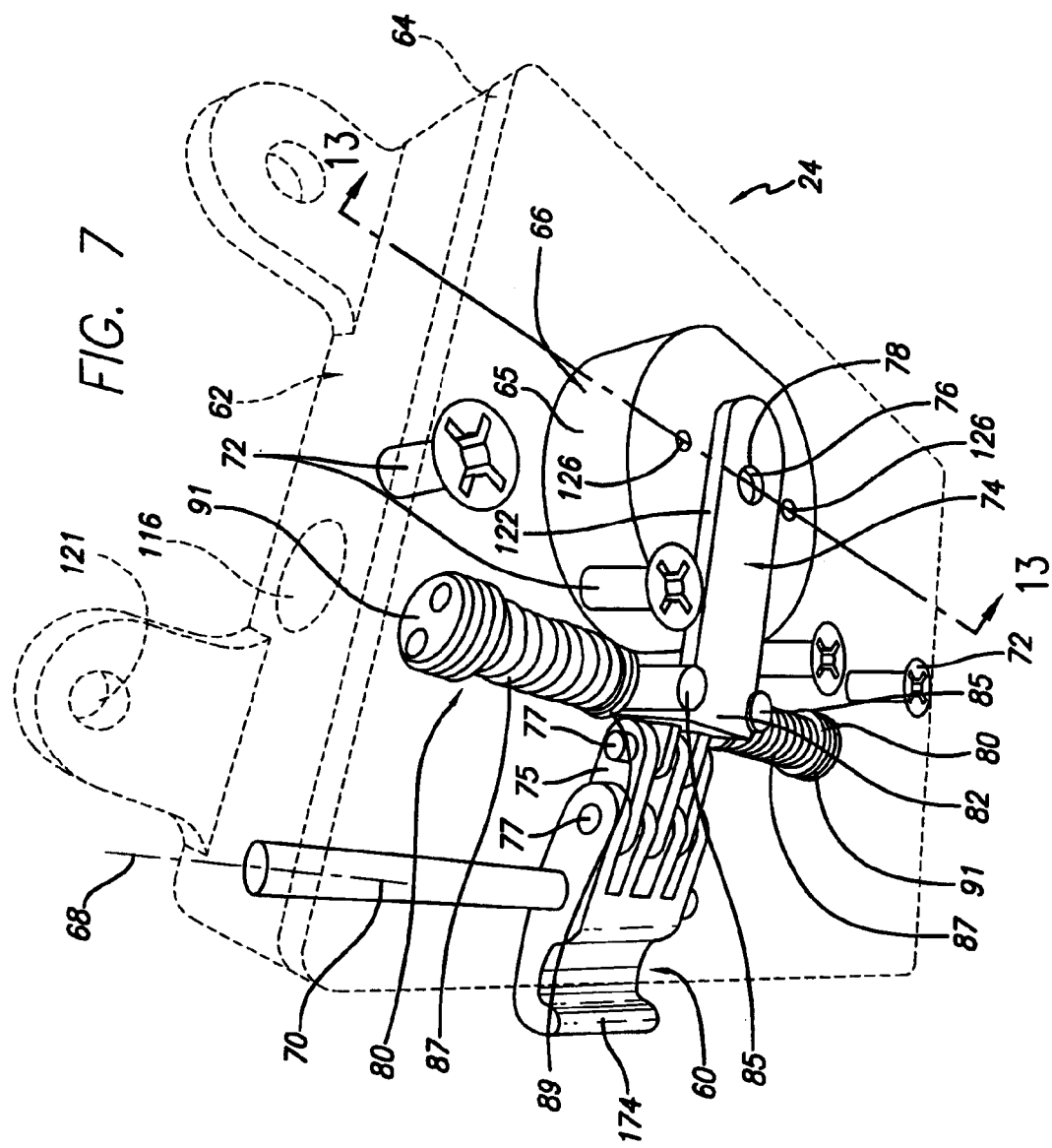
FIG. 7 is a bottom view of the latch mechanism shown with a housing and cover shown in phantom line.
Figure 8:
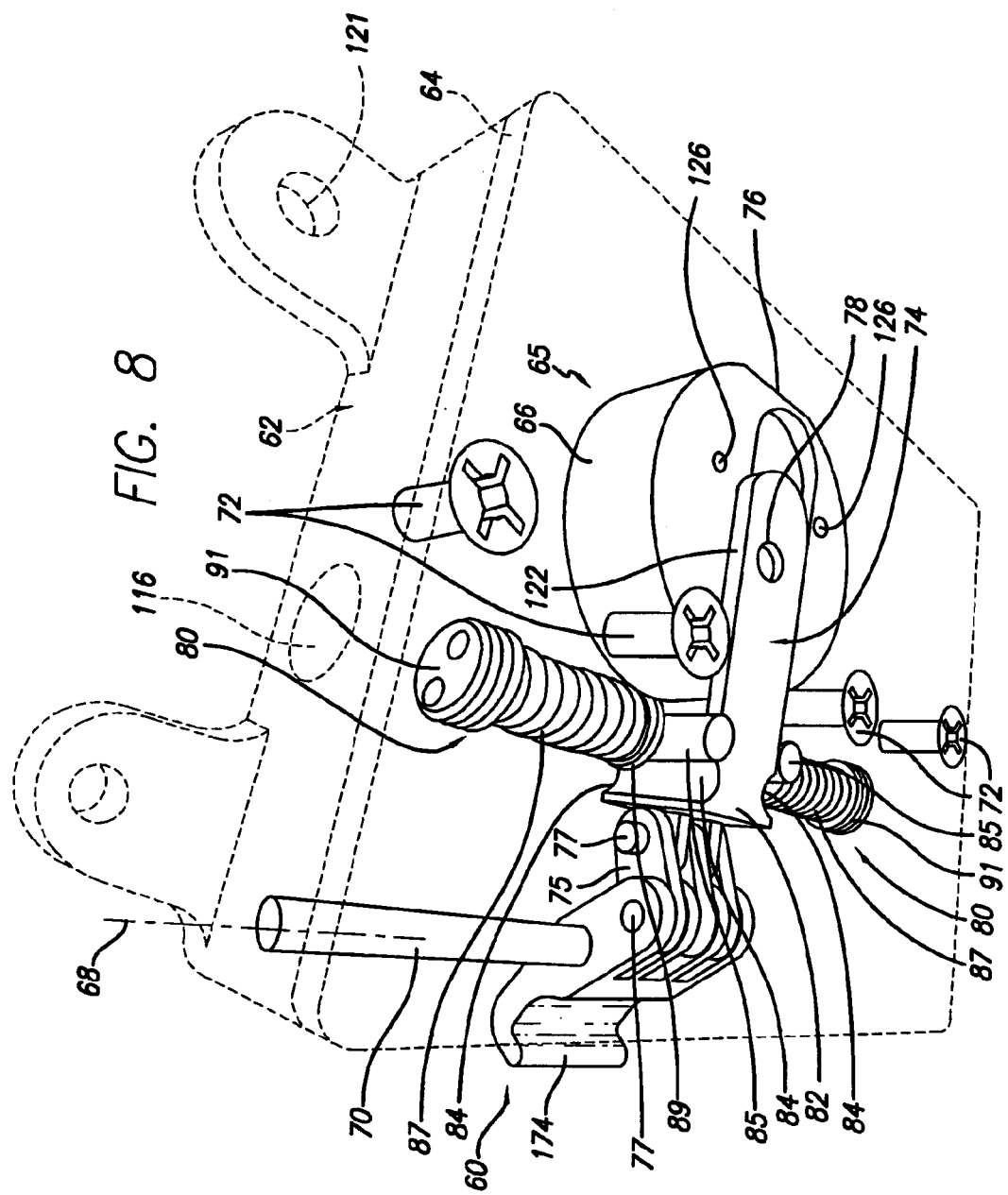
FIG. 8 is a view similar to that of FIG. 7, showing the bolt partially moved towards the unlocked position and showing a shear pin disengaged from a slide.
Figure 9:
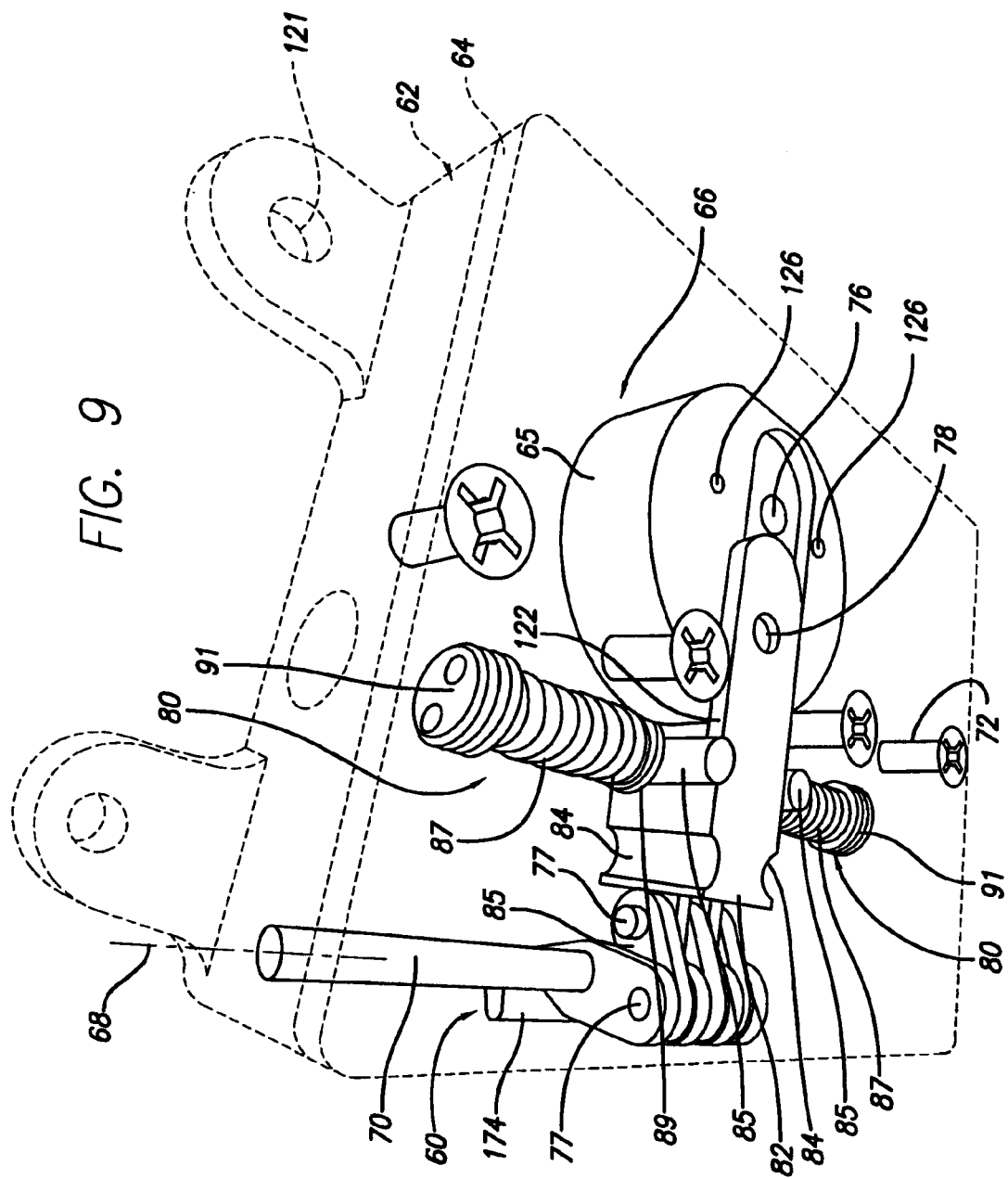
FIG. 9 is a view similar to that of FIGS. 7 and 8, showing the bolt in a fully unlocked position.
Figure 10:
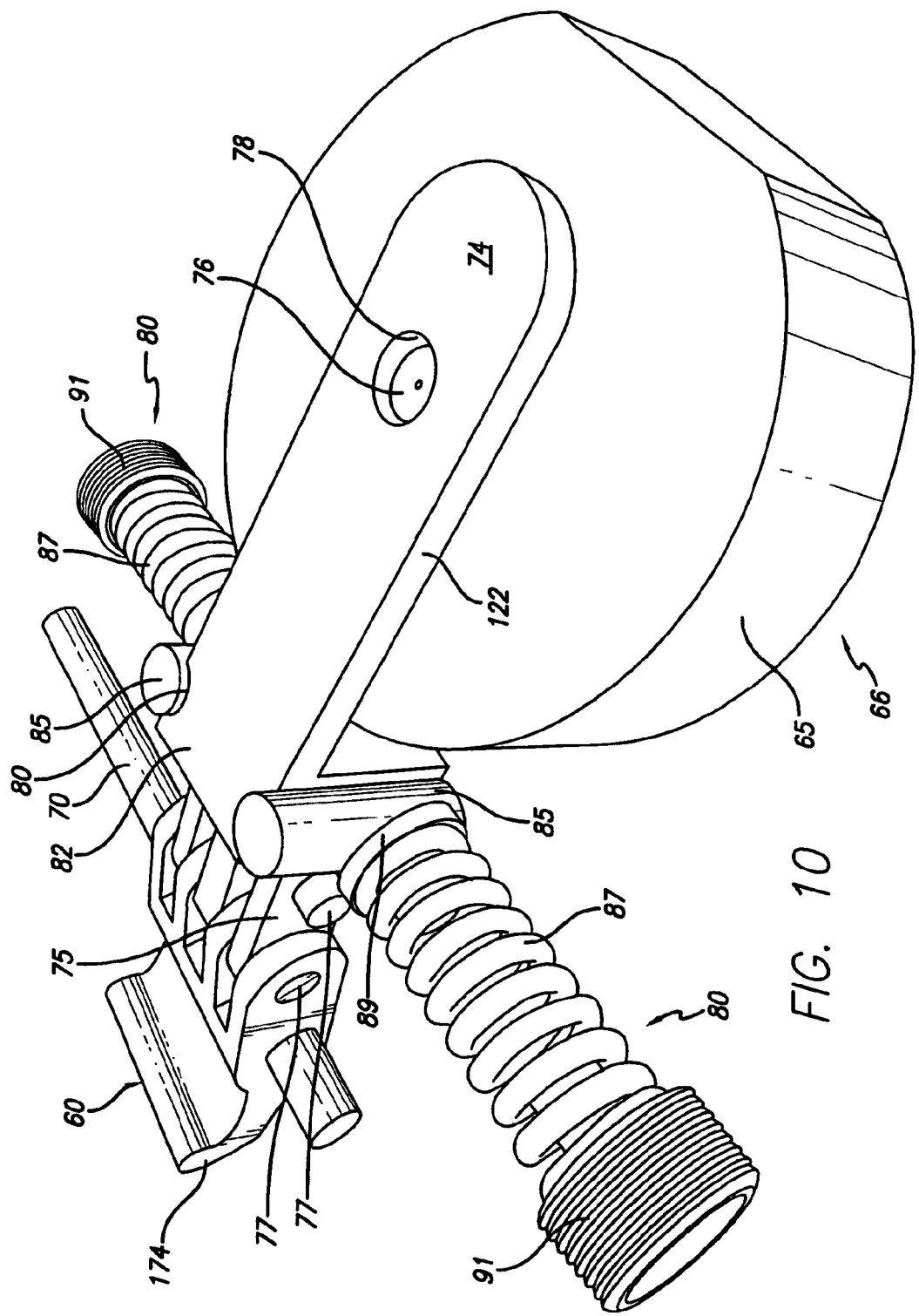
FIG. 10 is a bottom, perspective view of the pressure response device, bolt, slide, and retainers removed from the housing as the shear pin is disengaging from the slide and showing the retainers engaged with the slide.

When the pressure responsive device 66 is triggered to withdraw shear pin 76 from a mating relationship with aperture 78, slider 74 is retained in position by retainer assembly 80. Illustratively, the retainer assembly 80 is in the form of a spring biased retainer which biased against bolt-end 82 of slider 74. Slider 74 also has recesses 84, as can be seen in FIGS. 6 and 8, which receive a roller 85 biased by spring 87 held between a detent plug 89 and a detent set screw 91 and cooperate to retain slider 74 (and therefore bolt 60) in the retained, locked position until the biasing force provided by the retainer assembly 80 is overcome.

The detent plug 89 includes a post 110 which is received in a bore 112 defined by the spring 87. A face of the detent plug 89 includes a recess 114. The recess 114 is generally oriented to cradle the outside surface of the detent roller 85 to enhance the engagement operation of the retainer assembly 80. The set screw 91 is threaded and engages correspondingly threaded bore 116 in the housing 62. The set screw 91 can be operated to adjust the pre-load of the spring 87 on the rollers 85. The pre-load is adjusted by engaging the set screw 91 against the spring 87 and inwardly threading the set screw 91 until a desired pre-load force is exerted by the spring from a now compressed in the bore 116 against the detent plug 89 and corresponding detent roller 85.

The detent rollers 85 are axially inserted into corresponding receptacles 118 in the housing. The receptacles are slightly elongated relative to the bore 116 to provide some degree of movement of the rollers 85 relative to the slider 74. As such, when the determined detent force has been overcome, the slider 74 moves generally axially outwardly toward the bolt 60 end of the housing 62 along the slider channel 120. During this movement, the recesses 84 on the sides of the slider 74 disengage the rollers 85. The rollers 85 are slightly compressed against the spring 87 and are displaced inwardly into the receptacles 118. The rollers 85 are retained in this compressed position as a result of engaging the slider sides 122 while the slider 74 is extended in the channel 120.

The latch mechanism 24 includes structures which function to vent on only one side of the barrier 16. In this regard, there is no need to provide a venting passage between the cockpit 18 and the passenger compartment 19. This overcomes the problem of some situations in which venting to the passenger compartment 19 could be detrimental. While there are situations which benefit from venting on both sides of the compartments 18, 19, it may desirable to prevent interference or disruption of the latch mechanism 24 by venting on only one side of the barrier 16.

More particularly, there are situations in which venting from only the cockpit side 18 is desirable. For example, in order to avoid terrorist intrusion into the cockpit area 18 venting may only be desirable on the cockpit side. This construction provides the blow-out feature of the latch 24 but eliminates the opportunity for a terrorist to interfere or otherwise override the venting system which might occur by venting to both sides of the barrier 16. Chambers 83, 86 are provided in the housing 62 collectively defining a reservoir chamber 93 which is at least generally isolated from the cockpit ambient atmosphere in this example. The reservoir chamber 93 provides a reference pressure relative to and communicating with the air cylinder 65. The air cylinder 65 includes one side that communicates with the reservoir 93 and another side which communicates with the ambient atmosphere or cockpit atmosphere. The air cylinder 66 communicates with the chambers 83, 86, the reservoir chamber 93, by means of openings or apertures 126 communicating with passages 90, 92. This referential volume of air in the reservoir chamber 93 does not change in pressure rapidly. In contrast, an exposed or exterior side 61 of the housing 62 includes the outside surface 88 of the air cylinder 65. In the present example, this side 88 of the air cylinder 65 communicates with the cockpit atmosphere. As such, a rapid change in the pressure in the cockpit or ambient atmosphere will produce an effect on the outside contact surface 88 of the air cylinder 65.

The chambers 83, 86 do not respond as rapidly to the change in pressure. The difference in pressures and the rate at which the pressures change between the cockpit atmosphere and the atmosphere in the chambers 83, 86 facilitates operation of the latch mechanism 24. In this regard, slow changes in pressure in the cockpit atmosphere allow equalization of the pressure in the chambers 83, 86. As such, there is generally no movement of the shear pin 76 relative to the slider 74. However, when a rapid change occurs in the cockpit atmosphere, such as by way of a decompression event, the air cylinder 65 operates such that the drop in pressure withdraws the shear pin 76 from engagement with the aperture 78 causing disengagement of the shear pin 76 from the slider 74. As a result, disengagement of the slider 74 from the restraining force of the shear pin 76 facilitates displacement of the bolt assembly 60, 75 allowing disengagement of the latch mechanism 24 relative to the corresponding surface. As a result, the door or panel can swing open during such a decompression event. In the present example, the door or panel would swing inwardly towards the cockpit area to prevent the panel from being dislodged from the barrier 16 thereby preventing further damage to the cockpit crew, equipment and structure.

Figure 11:
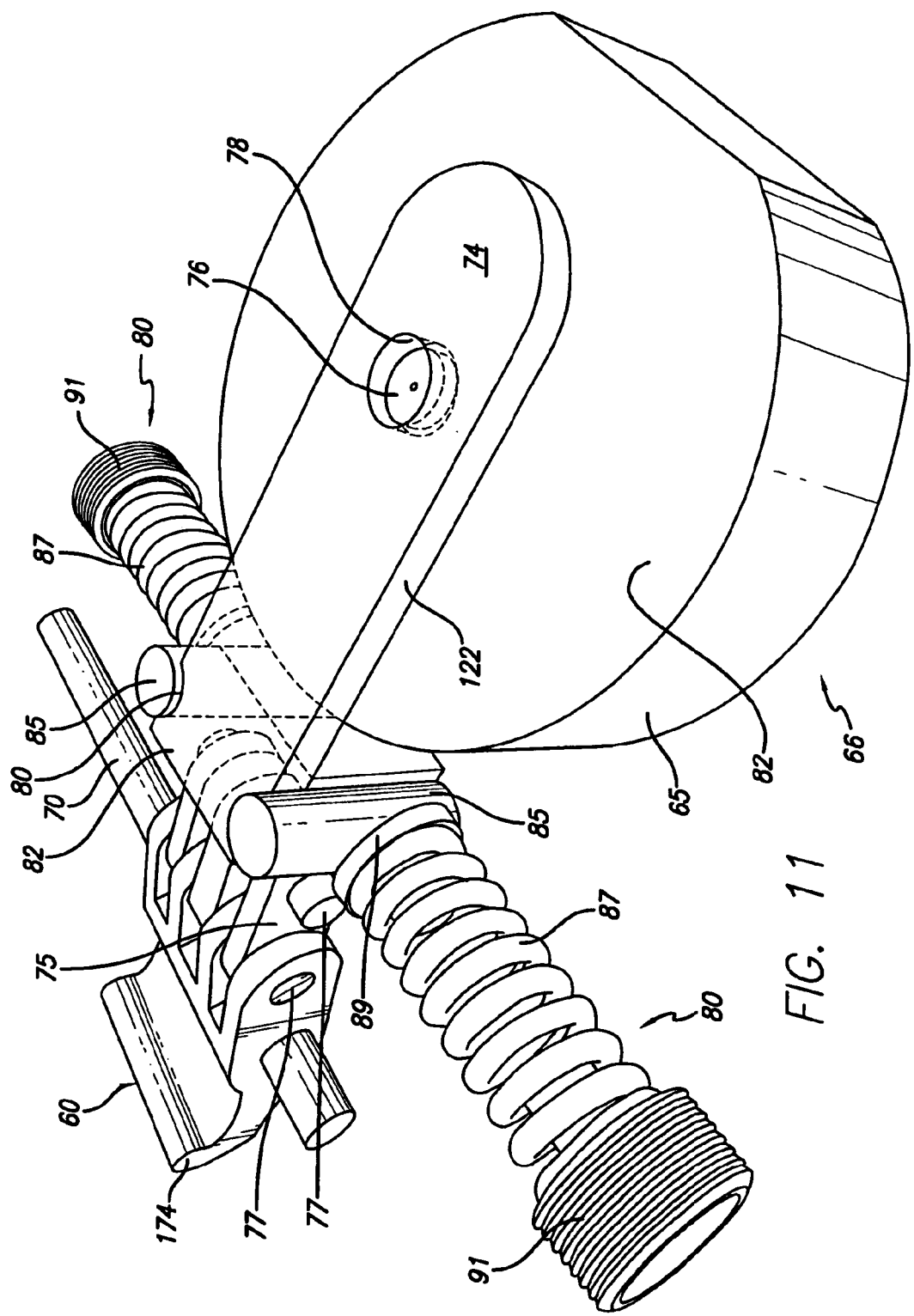
FIG. 11 is a view similar to that of FIG. 10 showing the slide and the shear pin as it disengages from the slide.
Figure 12:
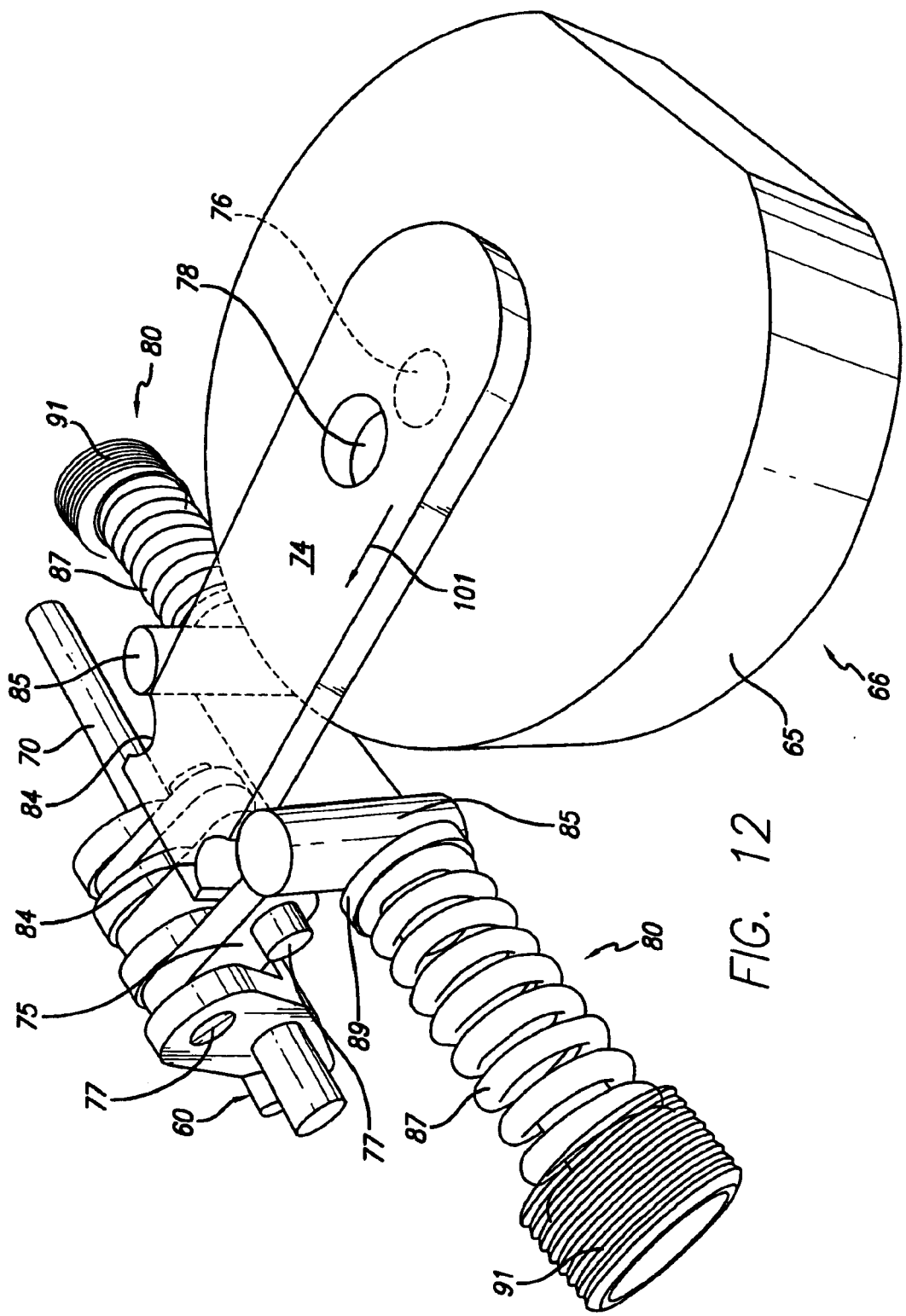
FIG. 12 is view similar to FIGS. 9 and 10 showing movement of the slide diminished and showing the shear pin disengaged from the slide so that the slide an be moved relative to the piston.

Another view of the state of the internal elements of the latch 24 when shear pin 76 is withdrawn from a mating relationship with aperture 78 can be seen in FIG. 11. Illustratively, shear pin 76 extends into and engages aperture 78 so that slider 74 can move 101 (see FIG. 12) relative to actuator 66 without being blocked by shear pin 76.

A retainer assembly 80 is illustratively configured to retain slider 74 until a predetermined amount of pressure or force is placed on bolt 60, at which time the biasing force of retainers 80 is overcome by the forces transmitted through bolt 60 that urge slider 74 to move relative to actuator 65. This predetermined amount of pressure could be, for example, the amount of pressure change within a predetermined period of time, deemed appropriate to release panel 40 from frame structure 38. For example, the air cylinder 66 can be configures to withstand a 300 Joule load. When a pressure drop of 0.5 psid in 4 ms is sensed. Upon satisfaction of these parameters to bolt 66 is released. This may be a pressure at which it is desired that panel 40 releases from frame structure 38 in order to prevent damage, or it may be a pressure at which it is desired that panel 40 can be opened or moved relative to frame structure 38 by an operator such as a flight attendant. For example, the spring 87 can be formed to provide a range of pre-loaded release load. For example, the spring could be manufactured for 25–50 pounds release load, another spring could be manufactured for 50–80 pounds release load and yet another spring might be manufactured for 80–110 pounds release load. The ranges above are for illustrative purposes only and are not intended to limit the application in any way. To the contrary, other ranges including release loads which are below or above those noted herein might also be applicable depending on the situation.

Figure 13:
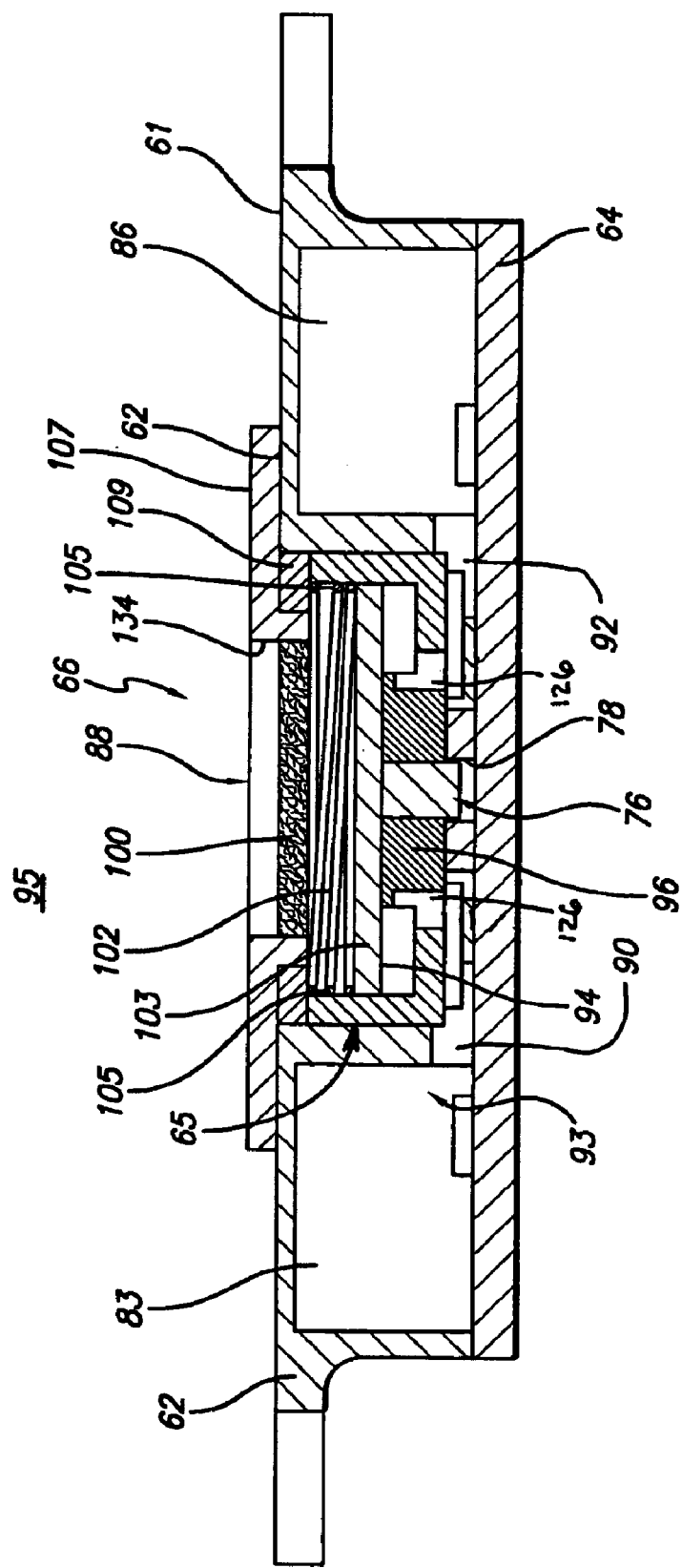
FIG. 13 is a sectional view taken along the line 13—13 of FIG. 7.

Turning to the sectional view shown in FIG. 13, it can be seen that the pressure responsive device, in the form of a pneumatic piston/actuator 65, operates in the manner as described. Housing 62 generally defines a first chamber 83 and a second chamber 86 on either side of air cylinder 65, collectively the reservoir chamber 93. The air cylinder 65 and reservoir 93 generally define the pressure responsive device 66 of the present embodiment. The chambers 83, 86 include corresponding subchambers 83x, 83y and 86x, 86y. The subchambers communicate through channels 83z and 86z, respectively. Cover 64 encloses the chambers 83, 86 and piston/actuator 65 on one end. A first side 88 of the pressure responsive device 66 or outside contact surface 88, is configured to be in contact with the environment 98 such as the cockpit or atmosphere. Chambers 83, 86 can be filled with any fluid, but are illustratively filled with air. Chambers 83, 86 connect with passageways 90, 92, respectively, wherein the fluid (i.e. air) comes into contact with or communicate with working surface 94 of piston/actuator 65. Illustratively, the locked position shown in FIG. 13 is achieved when the difference (if any) between environmental pressure and the fluid pressure inside chambers 83, 86 (and therefore inside passageways 90, 92) is such that the working surface 94 remains in contact with stopper 96, and shear pin 76 is releasably mated with aperture 78. The air cylinder 65 as illustrated maintains the shear pin 76 in an outwardly biased orientation as the result of spring 105 retained by cover 107 and gasket 109 retained by screws 111. In other words, the shear pin 76 is biased in an orientation in which it extends through the corresponding aperture 78 on the slider 74. The air cylinder 65 is retained in housing 62 by threaded set screws 113 extending through correspondingly threaded bore 115 which engage a flat ledge 117 on the housing 62.

When a pressure drop occurs in the ambient atmosphere or environment 98, air captured in the pressure responsive or ambient chamber 102 is drawn from or evacuated from the chamber and passes through filter 100 on outside contact surface 88 of piston/actuator 65 at a rate determined by the characteristics of filter 100. The filter 100 is provided to prevent the passage of particles, dust or other objects which may otherwise interfere with the operation of the actuator 66. The filter essentially provides a passage having a plurality of holes therethrough to allow generally free flow of air therethrough. However, as noted, the filter 100 prevents or at least reduces the passage of particles and other material which might otherwise have the potential to follow the actuator 66. It is within the scope of the present application to include merely a passage and not a filter in situations in which filtering may not be necessary. As air passes from chamber 102 to the environment 98, the pressure differential between chambers 83, 86 (and therefore inside passageways 90, 92), collectively the reservoir chamber 93, and ambient chamber 102 increases. This pressure differential causes working surface 94 of a diaphragm or piston head 103 piston/actuator 65 to move away from stopper 96, therefore moving shear pin 76 out of mating engagement with aperture 78.

As shown, the diaphragm or piston head 103 is carried in the chamber 102. The shear pin 76 is attached to the piston head 103 and travels with the movement of the piston head 103. The piston head 103 can be sealed within the chamber 102 but may be somewhat loose within the chamber. The degree of sealing depends on the degree of responsiveness required by the latch mechanism. For more sensitive applications, in which a quicker release may be required, the reservoir 93 can be sealed from the ambient chamber 102 by sealing the cover 64 to the housing 62 and providing a seal between the piston 103 and chamber 102. The seal between the piston 103 and chamber would be a sliding seal to allow movement of the piston 103 within the chamber. However, many decompression event situations may have such a rapid and significant change in pressure that a seal between the piston 103 and the chamber 102 may not be required.

Figure 17:
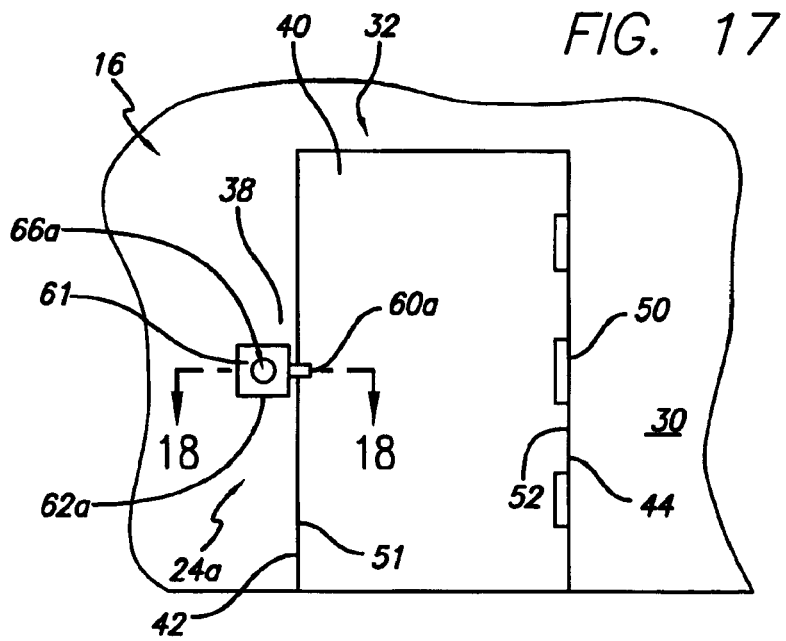
FIG. 17 is partial fragmentary general diagrammatic view of a latch mechanism in combination with a panel and a frame.
Figure 18:
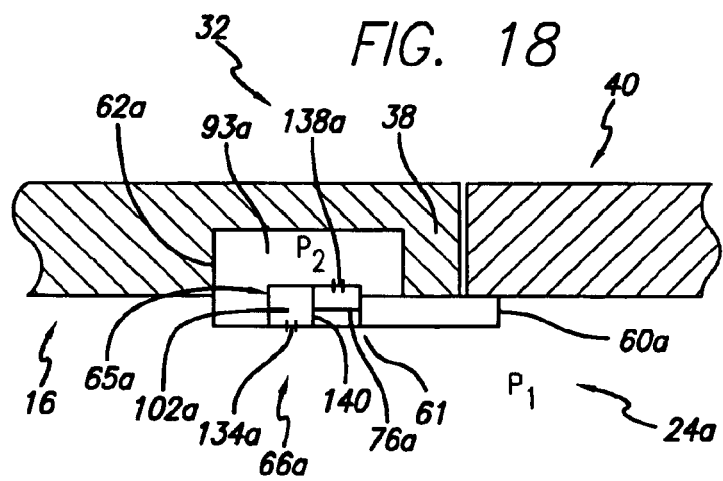
FIG. 18 is an enlarged, partial fragmentary, general diagrammatic cross-sectional view taken along line 18—18 in FIG. 17.
Figure 19:
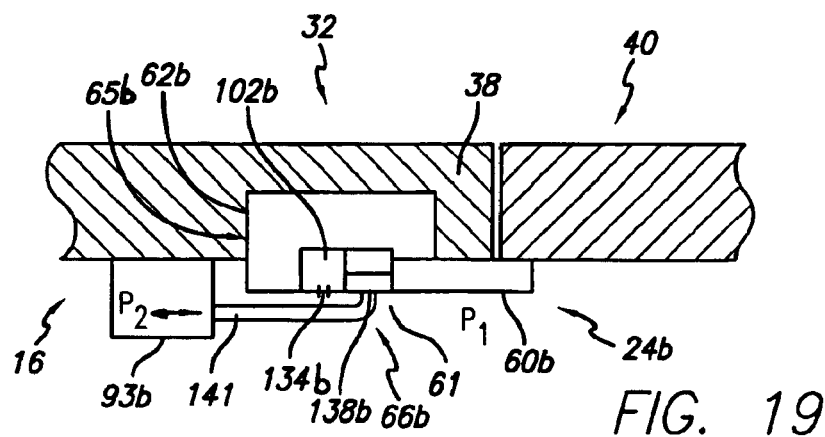
FIG. 19 is an enlarged partial fragmentary cross-sectional, general diagrammatic view similar to that as shown in FIG. 18 showing another embodiment of this general diagrammatic illustration of the latch mechanism.

With reference to FIGS. 17–19 a general diagrammatic illustration of the latch mechanism 24a described above is illustrated. The purpose of this general diagrammatic illustration is to show general concepts relating to the operation of the latch mechanism 24a. FIG. 17 is similar to FIG. 2 such that it shows a door or panel 40 retained relative to a frame 38. A retaining structure such as a hinge 50 is also provided. The latch mechanism 24a is similar to that as shown in FIGS. 4–16 such that the latch mechanism 24a includes a housing 62a, a bolt 60a and pressure responsive device 66a. The latch mechanism 24a as shown in FIGS. 17–19 is attached to the wall or frame 38. With reference to FIGS. 3–9, 14, 16, 20 and 21 the latch mechanism 24, 24a, 24c is attached to the frame 38 using fasteners extending through mounting holes 121, 121c. The fasteners and mounting holes 121 on the housing 62 is just one example of means for attaching the latch to the barrier 16.

With reference to FIG. 18, a general diagrammatic cross-sectional view is illustrated as taken along 18—18 in FIG. 17. In this view, the bolt 60a is generally diagrammatically shown engaging the panel 40. The latch mechanism 24a includes the housing 62a which includes the air cylinder 66a. As described above the air cylinder may take other forms but generally the cylinder is a form of pressure responsive device 66, 66a carried on the latch body or housing 62a. As diagrammatically illustrated, the pressure responsive device 66a includes a reservoir portion or chamber 93a and an ambient chamber portion 102a. The ambient portion or chamber 102a communicates through an opening 134a, or plurality of openings such as with the filter 100, with the ambient atmosphere on the side of the barrier 16 to which the latch 24 is attached. The reservoir chamber 93a communicates with the pressure responsive device 66a through an opening 138a or plurality of openings.

A diaphragm or piston 140 or other movable structure is operatively retained in the pressure responsive device attached through a linkage 76a, such as the pin 76 shown in FIG. 6, to engage the bolt 60a. The linkage 76a may engage the bolt or may actually be linked to the bolt to withdraw the bolt 60a relative to the flame 38. In this regard, the linkage 76a broadly, generally engages or acts upon the bolt 60a to retain the bolt in a retained position to hold the panel closed. Upon activation or operation of the diaphragm 140 the linkage 76a is withdrawn or otherwise operates on the bolt 60a to disengage or otherwise release the bolt 60a.

In circumstances in which the ambient pressure, P1 is generally equal to the pressure, P2, in the reservoir chamber 93a there is no force or action on the diaphragm 140 and linkage 76a. As such, the bolt 60a remains in engagement with the frame 38. When there is a change in the pressures P1, P2 such that P1 rapidly drops relative to P2, the change in pressure is a result of the ambient chamber 102 communicating through orifice 134a with the ambient atmosphere by either shift or force on the diaphragm 140 overcoming the normalizing and resisting force of the pressure P2 in the reservoir chamber 93a. It should be noted that the position of the latch mechanism 24 could be reversed such that the latch mechanism 24 is retained on the panel 40 and the bolt 60 engages the frame 38. A detent mechanism 80 such as that shown in FIG. 6 and other figures in this disclosure might also be used to provide resistance to unintended changes in the ambient atmosphere P1, which could initiate an unlatching event.

With reference to FIG. 19, another embodiment of the pressure responsive device 66b is shown in general diagrammatic form. In this embodiment, many of the same structures are similar to those as shown in FIG. 18. However, a separate, external reservoir chamber 93b is provided to provide a volume of atmosphere at a second pressure P2. The chamber 93b communicates with the pressure responsive device through orifice 134b. In this embodiment, the reservoir chamber 93b is coupled to the orifice 134b by means of a hose or line 141.

This embodiment allows a latch 24b, which might otherwise vent on both sides of the barrier 16, to be vented on a single side of the barrier. In this regard, latches have been developed which vent to the passenger compartment as well as the cockpit. This requires openings to the related chambers to be positioned on either side of the barrier 16. As noted above in this application, there are situations in which it may be undesirable to provide venting to both sides. As such, the separate reservoir 93b of the embodiment as shown in FIG. 19 can be connected to the orifice 134b which might normally be vented to the passenger compartment. This embodiment allows retrofitting of existing latches which vent on both sides of the barrier as well as allows more options in providing and producing latch mechanisms.

Turning now to FIGS. 20–23, another embodiment of the latch mechanism 20c is disclosed. With reference to FIG. 20, the latch mechanism 20c includes a housing 62c, a pressure responsive device 66c and bolt 60c. With reference to the partial fragmentary cross-sectional view of FIG. 21, the air cylinder 65c is retained in chamber 102c defined by the housing 62c. A reservoir chamber 93c communicates with the ambient chamber 102c by means of the passage 138c. As shown in FIG. 20, orifices 134c are provided on the housing 62c and communicate with the ambient chamber 102c. The ambient chamber 102c communicates with the filter or porous side 88c of the air cylinder 65c. The reservoir chamber 93c communicates through passage 138c with the air chamber 65c generally on an opposite side of a diaphragm or piston 140c. Cover 64c is held in place over open ends of the chambers 102c, 93c by means of screws 72c and a seal 150.

The bolt 60c is retained in bolt channel 120c. A flange 152 is positioned in the channel 120c to which an arm 154 of the bolt 60c is attached by means of a bushing 70c. The bushing 70c extends through a bore 155 in the bolt 60c, the bore 156 formed in the flange 152, and a corresponding portion of the bore formed in a side wall 160 of the channel 120c. A rivet 157 extends through the bushing 70c to moveable retain in the bolt 60c in the channel 120c. An opposing side wall 162 and base 164 define the channel 120c. The bolt 60c is pivotable into and out of the channel 120c about the bushing 70c.

A bore or receptacle 118c is formed in a portion of the bolt 60c for receiving components of the retainer assembly 80c. Similar to the retainer assembly 80 described above, the retainer assembly 80c includes a roller 85c which is captively retained in the receptacle 118c, a plug 89c, spring 87c and adjustment screw 91c which is threadably engaged with corresponding portion of the receptacle 118c. Instead of acting directly on a component of the bolt 60c such as shown in FIG. 6, the retainer assembly 80c provides a biasing force against a detent anchor 168 mounted to the base 164 by screws 170.

With reference to FIGS. 20, 21 and 23 the air cylinder 65c includes a pin 76c which is operatively retained in the air cylinder 66c, connected to the piston 140, and extends outwardly into a corresponding aperture 78c on the bolt 60c. The aperture 78c need not extend all the way through the corresponding portion of the bolt 60c but may be provided in the form of a recess for receiving the pin 76c.

In the locked position, the bolt 60c is generally flush with a top 61 of the housing 62c. An extending finger 174 of the bolt 60c extends outwardly away from the edge of the housing to engage a corresponding panel or other structure. During an activation or decompression event a change in pressure on the side (61) of the latch mechanism 24c facing the relevant compartment (for example the cockpit) will cause a change in pressure in the ambient chamber 102c communicating through apertures 134c. This change in pressure will affect the air cylinder 65c, retained in place in the chamber 102c by screw 176, by causing the pin 76c to be withdrawn into the air chamber 65c. The pin 76c will shift only if the pressure differential in the ambient chamber 102c is sufficiently greater than the pressure in the reservoir chamber 93c and sufficient to overcome the biasing force of spring 105c. Assuming that there is a significant pressure differential, the pin 76c will be disengaged from the aperture 78c. Disengagement of the pin 76c from the aperture 78c allows rotating or rotation of the finger 174 of the bolt 60c away from the corresponding surface. Generally, the bolt 60c will not move unless the force acting on the panel 40 to which it is related is sufficient to overcome the detent force provided by the retaining mechanism 80c.

Assuming that the force on the panel is sufficient, the transferred from the panel through on the finger 174 will cause the roller 85c to be moved relative to the anchor 168 causing a compression in the spring 87c. When the force applied to the finger 174c exceeds the force of the spring 87c on the roller 85c, the roller 85c will disengage the anchor 168 thereby allowing free movement of the bolt 60c and disengagement of the panel to which the latch mechanism is attached.

In use, the latch mechanism as disclosed provides a method of latching or holding a panel or door in a closed position against forces applied thereto. The latch mechanism includes structures which function to retain the panel in the closed or latched position subject to disengagement in response to a pressure differential. However, the pressure differential is sensed only on one side of a barrier to which the latch is attached. During a decompression event, the pressure on the other side of the barrier generally has little or no effect on the operation of the latch mechanism. Sensing of the pressure differential on a single side of the barrier is accomplished by including the air cylinder 66b or other pressure sensing device, including electrical, mechanical, hydraulic, pneumatic and any other suitable pressure sensing device. In contrast to other latch mechanisms which might require venting to both sides of a barrier, the present disclosure includes a reservoir which maintains a generally constant pressure relative to ambient. This reservoir or reservoir chamber does not change in response to a rapid change in ambient pressure.

The latch mechanism is provided including a bolt retained in a housing thereof. The air cylinder communicates with a reservoir chamber and is operatively coupled to the bolt. The bolt is retained in a locked position when the ambient pressure, P1, is generally equal to the reservoir pressure P2. Upon a sudden change in the ambient pressure P1 the bolt will be disengaged. A retaining mechanism can be provided to prevent disengagement of the bolt resulting from unintended or anomalous pressure changes. When the forces applied to the panel to which the latch mechanism is related are sufficiently greater than the retaining force of the retaining mechanism the panel will be displaced relative to the corresponding frame.

While embodiments of the disclosure are shown and described, it is envisioned that those skilled in the art may devise various modifications and equivalents without departing from the spirit and scope of the disclosure as recited in the following claims.

We claim:

1. A latch mechanism for releasably retaining a first structure relative to a second structure, the latch mechanism comprising:
   a housing attachable to at least one of a first structure and a second structure;
   a bolt releasably carried on the housing;
   a portion of the bolt abutting a portion of the other of a first structure and a second structure for preventing displacement of a first structure from a second structure;
   a pressure responsive device for detecting a decrease in pressure on one side of a panel;
   a bolt engaging device coupled to the pressure responsive device and moveably displaceable in response to operation of the pressure responsive device; and
   a receiving structure on the bolt for mechanically engaging at least a portion of the bolt engaging device to prevent displaceable movement of the bolt prior to operation of the pressure responsive device.

2. The latch mechanism of claim 1, wherein the bolt is pivotably retained on the housing.

3. The latch mechanism of claim 1, wherein the pressure responsive device is carried on the housing.

4. The latch mechanism of claim 1, the pressure responsive device further comprising an air cylinder and a reservoir, the air cylinder having a first side communicating with ambient atmosphere on the side of a panel to which the latch mechanism is attached, and a second side communicating with the reservoir, the first side being exposed to rapid changes in pressure in the ambient atmosphere and the second side being generally isolated from rapid changes in pressure in ambient atmosphere.

5. The latch mechanism of claim 1, wherein the pressure responsive device includes a pressure responsive diaphragm operatively retained in a pressure responsive chamber, the chamber including a first opening communicating with a first volume and a second opening communicating with a second volume, a pressure differential between the first volume and second volume acting on the pressure responsive diaphragm in the chamber.

6. The latch mechanism of claim 5, further comprising the pressure of the first volume is defined by ambient atmosphere and the pressure of the second volume is defined by a reservoir communicating with the pressure responsive chamber wherein the reservoir is generally isolated from ambient atmosphere.

7. The latch mechanism of claim 1, where in the pressure responsive device includes a pneumatic piston, operatively retained in a pressure responsive chamber, the pressure responsive chamber including a first opening communicating with a first volume having a first pressure and a second opening communicating with a second volume having a second pressure, a pressure differential between the first volume and second volume operating the piston in the chamber.

8. The latch mechanism of claim 1, wherein the pressure responsive device includes an electrical pressure sensing device and a moving device coupled to the electrical pressure sensing device, the electrical pressure sensing device communicating with a first volume having a first pressure and a second volume having a second pressure.

9. The latch mechanism of claim 1, further comprising a retaining mechanism providing a retaining force to retain the bolt in a latched positioned prior to exceeding a predetermined retaining force.

10. A latch mechanism for releasably retaining a panel relative to a frame, the latch mechanism comprising:
   a latch housing attachable to at least one of a panel and a frame;
   a bolt pivotably carried on the latch housing;
   a portion of the bolt extending from the latch housing for abutting a portion of the other of a panel and a frame to prevent displacement of a panel from a frame;
   a slider displaceably carried on the latch housing and operatively connected to the bolt;
   a pressure responsive device responsive to at least a decrease in pressure on the side of a panel to which the latch device is attached;
   a bolt engaging pin operatively connected to the pressure responsive device, the bolt engaging pin being moveably displaceable in response to operation of the pressure responsive device; and
   means for retaining the slider for engaging at least a portion of the bolt engaging pin to retain the slider against displacement prior to operation of the pressure responsive device.

11. The latching device of claim 10, wherein the pressure responsive device includes means for detecting at least a first pressure and a pressure reservoir defining a second pressure, generally isolated from the first pressure, the pressure responsive device operating in response to a differential between a first pressure and a second pressure.

12. The latch mechanism of claim 10, wherein the pressure responsive device is carried on the latch housing.

13. The latch mechanism of claim 10, wherein at least a portion of the pressure responsive device is separate from the housing and communicates with the housing.

14. The latch mechanism of claim 10, the pressure responsive device further comprising an air cylinder and a reservoir, the air cylinder having a first side communicating with ambient atmosphere on the side of a panel to which the latch mechanism is attached and a second side communicating with the reservoir, the first side being exposed to rapid changes in pressure in ambient atmosphere and the reservoir being generally isolated from rapid changes in pressure in ambient atmosphere.

15. The latch mechanism of claim 10, where in the pressure responsive device includes a pneumatic piston operatively retained in a piston chamber, the piston chamber including a first opening communicating with a first volume having a first pressure and a second opening communicating with a second volume having a second pressure, a pressure differential between the first volume and second volume operating the piston in the chamber.

16. The latch mechanism of claim 10, where in the pressure responsive device includes a pressure responsive diaphragm operatively retained in a pressure responsive chamber, the chamber including a first opening communicating with a first volume and a second opening communicating with a second volume, a pressure differential between the first volume and second volume acting on the pressure responsive diaphragm in the chamber.

17. The latch mechanism of claim 10, wherein the pressure responsive device includes an electrical pressure sensing device and a moving device coupled to the electrical pressure sensing device, the electrical pressure sensing device communicating with a first volume having a first pressure and a second volume having a second pressure.

18. The latch mechanism of claim 10, further comprising a retaining mechanism providing a retaining force on the bolt.

19. A method for controllably latching a panel relative to a frame, the latching method being responsive to a pressure differential detected on one side of a panel to which a latch mechanism is attached, the method comprising the steps of:
   providing a latch mechanism operatively associated with a panel;
   providing a bolt releasably carried on the latch mechanism, the bolt being operatively associated with a panel;
   providing a pressure responsive device operatively coupled to the bolt, the pressure responsive device communicating with ambient atmosphere;
   providing a reservoir communicating with the pressure responsive device, the reservoir being generally isolated from ambient atmosphere;
   retaining the bolt in engagement with a panel;
   detecting pressure on one side of a panel;
   operating the pressure responsive device in response to of a pressure differential between the reservoir and ambient atmosphere;
   disengaging the bolt from a panel upon development of a pressure differential of a predetermined degree; and
   displacing a panel relative to a frame upon disengagement of the bolt on a panel.

20. A latch mechanism for releasably retaining a panel, the latch mechanism comprising:
   a pressure responsive device carried on the housing and communicating with ambient atmosphere;
   a reservoir generally isolated from ambient atmosphere and communicating with the pressure responsive device;
   a bolt releasably carried on the housing and operatively engaged with the pressure responsive device; and
   the pressure responsive device releasing the bolt upon sensing a pressure differential between the ambient atmosphere and the reservoir.

* * * * *